United States Patent [19]

Brendel

[11] Patent Number: 5,044,273
[45] Date of Patent: Sep. 3, 1991

[54] ROLL APPARATUS WITH A HYDRAULICALLY SUPPORTED BOTTOM ROLL HAVING ADDITIONAL SUPPORTING ELEMENTS

[75] Inventor: Bernard Brendel, Grefrath, Fed. Rep. of Germany

[73] Assignee: Eduard Küsters Maschinenfabrik GmbH & Co. KG, Krefeld, Fed. Rep. of Germany

[21] Appl. No.: 450,827

[22] Filed: Dec. 14, 1989

[30] Foreign Application Priority Data

Dec. 22, 1988 [DE] Fed. Rep. of Germany ....... 3843294

[51] Int. Cl.$^5$ ................................................ B30B 3/04
[52] U.S. Cl. .................................. 100/162 B; 29/116.2
[58] Field of Search .................... 100/162 B; 29/113.1, 29/113.2, 116.1, 116.2

[56] References Cited

U.S. PATENT DOCUMENTS

| | | | |
|---|---|---|---|
| 3,921,514 | 11/1975 | Biondetti | 100/162 B |
| 4,188,814 | 2/1980 | Heuss | 100/162 B X |
| 4,319,389 | 3/1982 | Marchioro | 100/162 B X |
| 4,357,743 | 11/1982 | Hefter et al. | 100/162 B X |
| 4,480,452 | 11/1984 | Schnyder | 100/162 B X |
| 4,480,459 | 11/1984 | Feldman et al. | 100/162 B X |
| 4,625,637 | 12/1986 | Pav et al. | 100/162 B X |
| 4,709,571 | 12/1987 | Guttinger | 100/162 B X |
| 4,757,582 | 7/1988 | Verkasalo | 100/162 B X |
| 4,815,183 | 3/1989 | Bondetti | 100/162 B X |
| 4,848,119 | 7/1989 | Pav et al. | 100/162 B X |

*Primary Examiner*—Jimmy G. Foster
*Assistant Examiner*—Ted Kavanaugh
*Attorney, Agent, or Firm*—Kenyon & Kenyon

[57] ABSTRACT

In a roll apparatus formed by a top roll and a hydraulically supported bottom roll, which together form a roll nip, additional piston/cylinder units that can lift the hollow cylinder near its working position closing the roll nip are provided at least at the ends of the hydraulically supported bottom roll. Due to the geometric arrangement employed, this lifting function is operative only up to a predetermined position of the hollow cylinder relative to its crosshead, which is selected to be at a short distance before closure of the roll nip. The pressure in the piston/cylinder unit degenerates whenever the piston of the additional piston/cylinder unit is forced out of sealing contact with its respective cylinder when the predetermined position is reached.

18 Claims, 1 Drawing Sheet

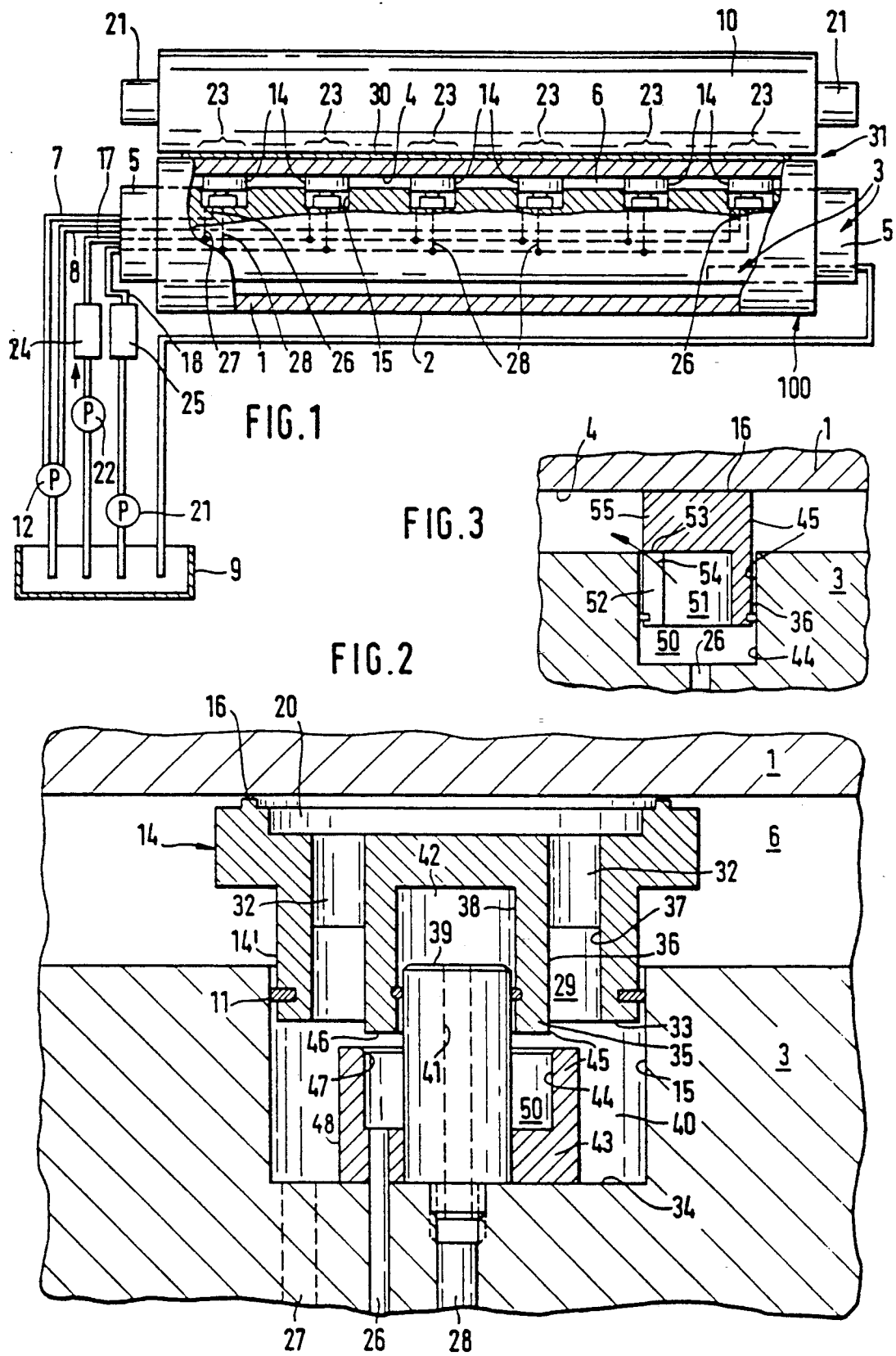

ROLL APPARATUS WITH A HYDRAULICALLY SUPPORTED BOTTOM ROLL HAVING ADDITIONAL SUPPORTING ELEMENTS

BACKGROUND OF THE INVENTION

The invention relates generally to a roll apparatus for treating webs of material and, more particularly, to an improved hydraulically supported roll.

A roll apparatus having an upper roll and a hydraulically supported bottom roll is disclosed in pending U.S. application Ser. No. 07/370,348, now U.S. Pat. No. 4,984,343, entitled Improved Sealing Element For A Hydrostatically Supported Roll, filed June 22, 1989 and assigned to the assignee of the present invention. In this application, the bottom roll includes a rotatable hollow cylinder, which forms the working roll circumference, and a stationary crosshead extending lengthwise through the cylinder to form a surrounding clearance space therewith. The hollow cylinder is radially displaceable, as a whole, in the active plane in a direction away from the crosshead. At least near each end of the hollow cylinder, a radial support element, which includes a piston/cylinder unit, abuts the inner circumference of the hollow cylinder. The piston and cylinder of the piston/cylinder unit are disengaged before the hollow cylinder contacts the upper roll of the roll apparatus. The cylinder of the piston/cylinder unit is provided with choke bores and the piston is received in the cylinder near the end of piston's dropping motion to displace the hydraulic fluid in the cylinder through the choke bores. This produces a damping effect in the last phase of the dropping motion. However, in the "active" lifting range, there is a dead travel segment in which damping does not occur.

The invention is applicable to rolls in which the ends of hollow cylinder are not fixedly supported on the crosshead, i.e., the hollow cylinder is not radially locked in position at its ends by the bearings that support the cylinder for rotation relative to the crosshead. Rather, the hollow cylinder of the rolls of the invention is radially displaceable in the active plane, as a whole, relative to the crosshead by a guide arrangement provided at the ends of the crosshead for rotatably supporting the hollow cylinder and allowing the desired radial movement. Such guide arrangements are well known in the art and rolls having such guide arrangements are commonly referred to as rolls having an "inner lift". One example of such a guide arrangement is specifically disclosed in FIG. 9 of U.S. Pat. No. 4,856,157.

An internal hydraulic support device provides for the pressing action of the hollow cylinder in the roll nip. The hydraulic support device may be provided in various ways, such as those described in DE-PS 10 26 609, DE-OS 22 30 139, U.S. Pat. No. 2,395,915, DE-PS 14 61 066, DE-OS 30 03 395 or U.S. Pat. No. 4,856,157.

In all rolls supported solely by a plurality of hydraulic force exerting elements, the problem of synchronous control, i.e. synchronizing the movements of the elements, exists. Care must be taken that the hollow cylinder is not positioned at a skew relative to the roll nip and that it does not abut at one end, while a large opening is present at the other end.

To solve this problem in rolls of the type in question, which have supporting elements distributed over the length of the roll functioning as an internal hydraulic support device, volume division by means of a pump providing the same volume of fluid to a plurality of outputs has been considered. With such a pump, the individual supporting elements are allotted essentially the same amount of hydraulic fluid. This type of arrangement demands a considerable degree of sophistication and, nevertheless, is not always satisfactory, because the hydraulic supporting elements may have different widths, so that even when the volumes are allotted equally, different displacements can occur.

Another possibility for rolls of the type in question would be a synchronous control in which the initial displacements of the supporting elements are measured at both ends of the roll and whenever one side advances more than the other, the quantity of hydraulic fluid fed to this side of the supporting elements is reduced. Even this type of control is costly.

SUMMARY OF THE INVENTION

Thus, one of the problems in which the invention is directed is that of providing synchronous control, in a simple manner, whenever the hollow cylinder of a hydraulically supported roll is operated to close the roll nip.

The invention solves this problem by providing a roll apparatus having a top roll and a hydraulically supported bottom roll defining a roll nip therebetween. The bottom roll includes a rotatable hollow cylinder having an inner circumference and an outer working roll circumference. A stationary crosshead extends lengthwise through the hollow cylinder to form a surrounding clearance space with the inner circumference of the hollow cylinder. The hollow cylinder is supported for radial displacement, as a whole, in the active plane away from the crosshead to a working position in the roll nip. At least one supporting element, provided near each end of the hollow cylinder, extends from the crosshead to abut the inner circumference of the hollow cylinder. Each supporting element includes a piston/cylinder unit having a piston and a cylinder. The piston is sealingly and slidably received in the cylinder to close the cylinder up to a predetermined relative position of the piston and cylinder corresponding to a predetermined position of the hollow cylinder in the roll nip short of the working position. The cylinder opens after the predetermined relative position is reached. A first hydraulic fluid supply line communicates with the cylinder whereby the piston/cylinder units move the hollow cylinder to the predetermined position short of the working position when hydraulic fluid is conducted to the cylinders.

When hydraulic fluid is fed through the first supply line to the cylinder of the piston/cylinder unit, the hollow cylinder is lifted away from the crosshead until the cylinder opens as the piston and cylinder are disengaged. The position where this occurs is determined geometrically, namely, by the length of the piston, which maybe designed as a cylindrical extension of the supporting element, or by the position of a bypass passage or the like. When the limit position is reached, i.e., when the piston and the cylinder of the piston/cylinder unit disengage or a bypass passage is opened, the hydraulic fluid in the cylinder may flow out of the cylinder and no further displacement takes place. It is not necessary to regulate the amount of the hydraulic fluid supplied to the supporting elements at the ends of the hollow cylinder. They simply must be able to move independently of each other, whereby the limit position is determined exactly by the dimensioning of the piston and cylinder or by the position of the bypass passage. The limit position is selected so that the roll nip is nearly, but not completely closed. Any additional positioning then is accomplished by means of the internal hydraulic supporting device, while the line force builds up. The supporting elements of the invention no longer are effective over the small distance which still remains. This is not important, however, because this small distance lies within the order of magnitude of the accuracy that known synchronization controls are able to produce anyway.

The remaining displacement distance may be on the order of magnitude of about 1 to 2 mm, i.e., the stroke of each piston/cylinder unit is dimensioned such that the unit disengages or the bypass passage opens 1 to 2 mm before the working position of the hollow cylinder (closed roll nip) is reached.

The internal hydraulic support of the bottom roll may be provided by sealing elements similar to those disclosed in pending U.S. application Ser. No. 07/370,348, now U.S. Pat. No. 4,984,343, discussed above, in which piston-like sealing elements are mounted in cylinder bores in the crosshead and each sealing element has a hydrostatic bearing pocket formed in its contact surface, which is shaped to conform to the inner circumference of the hollow cylinder. With such a design, each piston/cylinder unit may be mounted in one of the cylinder bores of the sealing elements such that one of the piston and cylinder is connected with the sealing element and the other with the crosshead. The cylinder communicates with the cylinder bore upon disengagement of the piston and cylinder or opening of a bypass passage. In one specific embodiment, the cylinder is formed by a cylindrical member mounted on the base of the cylinder bore and the piston is formed by a cylindrical extension of the sealing element.

In principle, the hydraulic fluid flowing from the cylinder of the piston/cylinder unit upon disengagement of the sealing contact between the piston and cylinder can be used to operate the hydrostatic pressure chamber of the sealing element. In this case, the supply line for the cylinder of the piston/cylinder unit would be the only supply line, which would also supply the cylinder bore of the sealing element.

However, it is recommended in many cases to provide a separate supply line to operate the pressure chamber formed underneath the sealing element in the cylinder bore of the sealing element. This is due to the fact that larger quantities of fluid must be made available under a greater pressure to this pressure chamber, since this pressure helps generate the line force, while only small quantities of fluid, determined by the volume of the cylinder and under a relatively low pressure, are necessary merely to lift the hollow cylinder.

Further features, embodiments and advantages of the invention are apparent from consideration of the following detailed description, drawings and appended claims.

BRIEF DESCRIPTION OF THE DRAWINGS

FIG. 1 illustrates a longitudinal view, partly in section, of a roll apparatus constructed according to the principles of the invention;

FIG. 2 illustrates a longitudinal section view through one of the sealing elements depicted in FIG. 1; and FIG. 3 illustrates another embodiment of the invention corresponding to the view shown in FIG. 2.

DETAILED DESCRIPTION

The roll apparatus comprises a top roll 10 and a bottom roll 100 between which a web 30 is conducted for pressure treatment in the roll nip 31. The top roll 10 is a conventional, solid roll. The bottom roll 100, on the other hand, is a hydraulically supported roll comprising a rotating hollow cylinder 1, whose outer circumference 2 forms the working roll circumference. A stationary crosshead 3 extends lengthwise through cylinder 1 to form a surrounding clearance space with the inner circumference 4 of the hollow cylinder 1 such that the crosshead 3 can bend within the hollow cylinder 1 without coming into contact with the inner circumference 4. The necks 21 of the top roll 10, as well as the ends 5 of the crosshead 3 protruding from the hollow cylinder 1, are supported in a cylinder stand or similar supporting structure and are pressed together by suitable tensioning devices (not shown).

The hollow cylinder 1 is guided for movement in the active plane, i.e., the plane connecting the axes of rolls 10 and 100, which lies parallel to the plane of the drawing in FIG. 1, by slidable guide mechanisms (not shown) mounted on the ends of the crosshead 3. In this manner, the hollow cylinder can radially shift as a whole in the active plane, to close or open the roll nip 31 without affecting its ability to rotate. Such guide mechanisms are well known in the art and one example of such a guide mechanism is shown in FIG. 9 of U.S. Pat. No. 4,856,157, as discussed above. The disclosure of this patent is incorporated by reference herein.

The line force is generated by an internal hydraulic support comprising annular sealing elements 14, which are movably guided in the cylinder bore holes 15 provided in the top side of the crosshead 3 by their piston-like lower part 14'. The sealing elements 14 have an appropriately designed top surface 16, which forms a contact surface for sealingly abutting the inner circumference 4 of the hollow cylinder 1. The contact surface 16 has an annular, circumferential sealing segment, which seals a bearing pocket 20, enclosed by the segment, from the clearance space 6 formed between the inner circumference 4 of the hollow cylinder 1 and the outer circumference of the crosshead 3. In this manner, a higher pressure can be maintained in the bearing pocket 20, which opens toward the inner circumference 4 of the hollow cylinder 1, than in the clearance space 6. The pressure in zones 23 acts against the inner circumference 4 of the hollow cylinder 1 where it is offset by the flexural stiffness of the hollow cylinder 1 such that a line force is generated in the roll nip 31 that is sufficiently uniform over the extent of the roll nip.

The piston-like, cylindrical lower part 14' of the sealing element 14' is slidably received with clearance in the cylinder bore 15, radially disposed in the crosshead. Cylinder bore 15 is sealed by a peripheral seal 11 provided on part 14'. In this manner, if the crosshead 3 should bend, the sealing element can offset certain alignment errors between the crosshead and the hollow cylinder 1 without force and without loss of seal integrity.

The sealing element 14 is shaped essentially as a flat disk, whose top side surface includes the contact segment 16, which as mentioned above forms the border of the flat, bearing pocket 20. The cylindrical lower part 14' of the sealing element depends from the bottom side of the flat disk. In the lower part 14', a coaxial, central recess 29 is provided. Several ducts 32, which emanate from recess 29, extend axially to the bearing pocket 20. Hydraulic fluid from the chamber 40 formed in the cylinder bore 15 between the bottom side 33 of the sealing element 14 and the base 34 of the cylinder bore 15 thus can be conducted via the ducts 32 into the bearing pocket 20.

A hollow cylinder 35 projects from the bottom surface of the disk-shaped part of the sealing element 14 into the recess 29. Hollow cylinder 35 has an outer circumference 36 which is spaced from the circumference 37 of the recess 29. A piston-like, cylindrical element 39, which is screwed into the base 34 of the cylinder bore 15 and projects upwardly therefrom, is slidably received in the inner, cylindrical recess 38 of the hollow cylinder 35. The cylindrical element 39 includes a bore 41 extending axially through the element 39. The interior space 42 of the hollow cylinder 35 is closed, except for the bore 41, in every position of the sealing element 14 relative to the cylindrical element 39.

A cup-shaped, cylindrical member 43 open at its top is secured to the base 34 of the cylinder bore 15. The outer circumference 36 of the hollow cylinder 35 can sealingly engage within the cylindrical recess 44 of this cylindrical member 43 such that parts 35 and 43 form a piston/cylinder unit 45 and a cylinder 50 is formed in the recess 44 below the bottom side 46 of the hollow cylinder 35. When the hollow cylinder 35 dips into the cylinder 50, a pressure is generated therein that drives the sealing element 14 upward to exert a corresponding lifting force on the hollow cylinder 1.

The position of the upper edge 47 of the recess 44 in the cylindrical member 43 and the position of the bottom side 46 of the hollow cylinder 35 are adjusted relative to each other such that whenever there is a lifting movement of the sealing element 14, the hollow cylinder 35 extends beyond the edge 47, before the roll nip 31 is completely closed. In practice, it is sufficient if this position is reached approximately 1 to 2 mm short of closure of the roll nip. Hydraulic fluid then flows from the cylinder 50, over the leading edge formed by the edge 47 such that, by means of the pressure in the cylinder 50, the sealing element can be lifted to a desired position, but not further than that position.

The outer circumference 48 of the cylindrical member 43 has a smaller diameter than the inner circumference 37 of the recess 29 of the sealing element 14 such that the top edge of the cup-shaped cylindrical member 43 is received within the recess 29 and the sealing element 14 can sink down far enough into the crosshead 3.

The roll apparatus described above may have the following mode of operation. The pump 12 draws hydraulic fluid from the supply tank 9 and distributes it under pressure to two supply lines 7 and 8. The supply lines 7 and 8 are connected to branch lines 26, which in the embodiment shown lead to the two outermost sealing elements. When the pump 12 is actuated, the cylinder 50 is pressurized and the hollow cylinder 1 is lifted to the desired height by the same amount on both ends, which is determined by the geometry of the cylindrical member 43 and the hollow cylinder 35. Normally, it is sufficient to have only one piston/cylinder unit 45 at each end of the hollow cylinder 1.

The pump 21 likewise draws hydraulic fluid from the supply tank 9 and conveys it to controller 25, which pressurizes the supply line 18 to a regulated pressure that can be supplied via the branch lines 28 to the individual sealing elements. To simplify the drawing, only one line 18 is shown. However, the line 18 may, in actuality, be a plurality of lines, by means of which each individual sealing elements 14 or groups of such sealing elements can be supplied separately with fluid at different pressures. The fluid pressures in the lines 28 are conducted to the cylindrical space 42 of the respective sealing element, which determines the operating contact pressure of the sealing element 14.

Pump 22 supplies hydraulic fluid to a controller 24, which conveys a regulated amount of hydraulic fluid to the line 17, from where it is fed via branch lines 27 to the chambers 40 of the individual sealing elements 14. From chambers 40 the fluid passes through the ducts 32 to the bearing pocket 20, where it flows away over the boundary or sealing edge 16 and forms a cohesive liquid film.

The branch line 27 is shown in dotted lines in FIG. 2 because it is not always needed in the illustrated embodiment, as during operation, when a piston/cylinder unit 45 has been disengaged, the liquid flowing from the cylinder 50 over the edge 47 and into the chamber 40 could be used to supply the bearing pocket 20. The piston/cylinder unit used to lift the hollow cylinder 1 in FIG. 1 and 2 is integrated with the sealing element 14.

This basic idea is depicted again separately in the embodiment shown in FIG. 3. A cylinder bore 44 is formed in the top side of the crosshead 3. A piston-like part 55, which has a contact surface 16 abutting the inner circumference of the hollow roll 1, is sealingly movable in this cylinder bore 44. A cylinder 50, which is supplied with hydraulic fluid via the branch line 26, is formed under the piston-like part 55. While in the specific embodiment of FIG. 2, the hollow cylinder 35 forming the piston of the piston/cylinder unit 45 projects completely out of the cylinder bore 44, in the embodiment of FIG. 3, the lower part of the hollow cylinder remains in the cylinder bore 44 for guidance reasons. A recess 51 is provided in the lower part of the piston 55, which is radially slit at least at one location 52. Thus, when, as a result of the pressure in the cylinder 50, the piston 55 has reached the position depicted in FIG. 3, hydraulic fluid can emerge from the cylinder 50 through the slit 52 in the direction of the arrow 54. The piston 55 can lift the hollow cylinder 1 only to the point where the upper boundary edge 53 of the slit 52 has reached the top side of the crosshead 3 and, consequently, has established a connection from the cylinder 50 to the clearance space outside the sealing element.

The embodiment of FIG. 3 serves only to lift the roll. The piston-like part 55 has on its top side a contact surface 16 designed as a gliding surface only; it does not have a hydrostatic bearing pocket. The piston-like part 55 serves only to lift the hollow roll 1 and loses this capability when the hydraulic supporting device becomes active. The device of FIG. 3 can be combined with a supporting device of any design, including one that does not employ individual supporting elements.

Besides positioning a bottom roll in a roll pair according to FIG. 1, the various embodiments of the piston/cylinder unit 45 also can be used to position the bottom roll in a calender having a so-called "floating stack".

What is claimed is:

1. A roll apparatus having a top roll and a hydraulically supported bottom roll defining a roll nip therebetween, said bottom roll comprising:
   a rotating hollow cylinder having an inner circumference and an outer working roll circumference;
   a stationary crosshead extending lengthwise through said hollow cylinder to form a surrounding clearance space with the inner circumference of the hollow cylinder;

said hollow cylinder being supported for radial displacement, as a whole, in the active plane away from the crosshead to a working position in the roll nip; and at least one supporting element provided near each end of the hollow cylinder extending from the crosshead to abut the inner circumference of the hollow cylinder, each supporting element comprising a piston/cylinder unit including:

a piston and a cylinder, said piston being sealingly and slidably received in said cylinder to close said cylinder up to a predetermined relative position of said piston and cylinder corresponding to a predetermined position of the hollow cylinder in the roll nip short of the working position, said cylinder opening after said predetermined relative position is reached; and a first hydraulic fluid supply line communicating with the cylinder whereby the piston/cylinder units move the hollow cylinder to the predetermined position short of the working position when hydraulic fluid is conducted to the cylinders.

2. The roll apparatus of claim 1 wherein each piston/cylinder unit has an effective stroke dimensioned such that each cylinder space opens about 1 to 2 mm short of the working position of the hollow cylinder.

3. The roll apparatus of claim 1 wherein:

said supporting elements are formed as piston-like sealing elements mounted in respective radial bores in the crosshead, each piston-like sealing element having a contact surface shaped to conform with the inner circumference of the hollow cylinder, said contact surface being formed by an enclosed rim defining a hydrostatic bearing pocket open toward the inner circumference of the hollow cylinder, and a second hydraulic fluid supply line communicating with its respective radial bore; and each piston/cylinder unit is mounted in one of the radial bores such that one of said piston and cylinder is connected with the piston-like sealing element mounted in the radial bore and the other of the piston and cylinder is connected with the crosshead wherein the cylinder communicates with its respective radial bore when the cylinder opens after said predetermined relative position is reached.

4. The roll apparatus of claim 2 wherein:

said supporting elements are formed as piston-like sealing elements mounted in respective radial bores in the crosshead, each piston-like sealing element having a contact surface shaped to conform with the inner circumference of the hollow cylinder, said contact surface being formed by an enclosed rim defining a hydrostatic bearing pocket open toward the inner circumference of the hollow cylinder, and a second hydraulic fluid supply line communicating with its respective radial bore; and each piston/cylinder unit is mounted in one of the radial bores such that one of said piston and cylinder is connected with the piston-like sealing element mounted in the radial bore and the other of the piston and cylinder is connected with the crosshead wherein the cylinder communicates with its respective radial bore when the cylinder opens after said predetermined relative position is reached.

5. The roll apparatus of claim 3 wherein the cylinder is formed in a cylindrical member mounted in the radial bore and the piston is formed by a cylindrical extension depending from a bottom side of the piston-like sealing element.

6. The roll apparatus of claim 4 wherein the cylinder is formed in a cylindrical member mounted in the radial bore and the piston is formed by a cylindrical extension depending from a bottom side of the piston-like sealing element.

7. The roll apparatus of claim 3 wherein the second supply line includes at least part of the first supply line.

8. The roll apparatus of claim 4 wherein the second supply line includes at least part of the first supply line.

9. The roll apparatus of claim 5 wherein the second supply line includes at least part of the first supply line.

10. The roll apparatus of claim 6 wherein the second supply line includes at least part of the first supply line.

11. The roll apparatus of claim 3 wherein the first and second supply lines are separate.

12. The roll apparatus of claim 4 wherein the first and second supply lines are separate.

13. The roll apparatus of claim 5 wherein the first and second supply lines are separate.

14. The roll apparatus of claim 6 wherein the first and second supply lines are separate.

15. The roll apparatus of claim 1 wherein said cylinder has an opening at one end, said piston closes said opening when received in the cylinder, and said predetermined relative position of said piston and cylinder is reached as the piston moves out of the opening.

16. The roll apparatus of claim 1 further comprising a bypass passage formed in one of said piston and said cylinder, said bypass passage being uncovered to open said cylinder upon attainment of said predetermined relative position of said piston and cylinder.

17. The roll apparatus of claim 3 wherein each piston-like sealing element includes an additional piston/cylinder unit communicating with a third hydraulic fluid supply line, said additional piston/cylinder unit being operable to move said hollow cylinder from said predetermined position to said working position and generate a line force in the roll nip.

18. The roll apparatus of claim 4 wherein each piston-like sealing element includes an additional piston/cylinder unit communicating with a third hydraulic fluid supply line, said additional piston/cylinder unit being operable to move said hollow cylinder from said predetermined position to said working position and generate a line force in the roll nip.

* * * * *

UNITED STATES PATENT AND TRADEMARK OFFICE
CERTIFICATE OF CORRECTION

PATENT NO. : 5,044,273

DATED : September 3, 1991

INVENTOR(S) : Bernhard Brendel

It is certified that error appears in the above-identified patent and that said Letters Patent is hereby corrected as shown below:

Column 4, lines 53-54, "sealing element 14'" should read

--sealing element 14--

Signed and Sealed this

Ninth Day of March, 1993

Attest:

STEPHEN G. KUNIN

*Attesting Officer*     *Acting Commissioner of Patents and Trademarks*